INVENTOR
Karl Flury
By Pierce Scheffler & Parker
Attorneys

INVENTOR
Karl Flury
By Pierce Scheffler & Parker
Attorneys

Sept. 2, 1958 | K. FLURY | 2,850,569

ELECTRIC ARRANGEMENT FOR SPEECH TRANSMISSION IN TWO DIRECTIONS

Filed Aug. 30, 1954 | 5 Sheets-Sheet 3

INVENTOR
Karl Flury
By Pierce, Scheffler & Parker
Attorneys

INVENTOR
Karl Flury
By Pierce, Scheffler & Parker
Attorneys

Sept. 2, 1958 K. FLURY 2,850,569

ELECTRIC ARRANGEMENT FOR SPEECH TRANSMISSION IN TWO DIRECTIONS

Filed Aug. 30, 1954 5 Sheets-Sheet 5

INVENTOR
Karl Flury
By Pierce, Scheffler & Parker
Attorneys

United States Patent Office 2,850,569

Patented Sept. 2, 1958

2,850,569

ELECTRIC ARRANGEMENT FOR SPEECH TRANSMISSION IN TWO DIRECTIONS

Karl Flury, Adliswil, Switzerland, assignor to Defensor A. G., Zurich, Switzerland Application August 30, 1954, Serial No. 452,969

Claims priority, application Switzerland September 7, 1953

11 Claims. (Cl. 179—1)

The present invention relates to an electric arrangement for speech transmission in two directions, having a receiving amplifier and a loudspeaker to reproduce an incoming call, together with a microphone and a sending amplifier for an outgoing speech and with means in both amplifiers to change the amplification factors through control voltages.

Arrangements of the type have been made known as intercommunication systems or as loudspeaking telephones, suffering however from various disadvantages, say, that each time one has to change over to "speaking" and "listening" or that acoustic reaction takes place between the loudspeaker and the microphone.

The invention has for its object to obviate these disadvantages. The arrangement according to the invention is primarily characterized in that the means for altering the amplification factor of one amplifier steadily attenuate the amplification factor through negative control voltage and steadily increase it through positive control voltage, whereas the corresponding means of the other amplifier steadily increase the amplification factor through negative control voltage and attenuate it through positive control voltage. The arrangement is further characterized by an automatic control device to produce a single control voltage to control both the receiving amplifier as well as the sending amplifier, said control device including a first rectifier joined to the receiving amplifier to produce a first direct voltage in function of the intensity of the receiving signal, together with a second rectifier joined to the sending amplifier to produce a second direct voltage in function of the intensity of the microphone voltage, polarized in opposition to the first direct voltage, the two direct voltages being conducted to the same point, where, out of the two direct voltages, a differential voltage will arise which is the said control voltage fed to the control means of the two amplifiers, the arrangement being such that, on the occurrence of a receiving signal, the amplification factor of the receiving amplifier will be increased and that of the sending amplifier is decreased, and that, incidental to a sufficiently intense microphone signal, the amplification factor of the sending amplifier will be increased and that of the receiving amplifier is decreased.

Further features of the invention will become apparent from the claims and the description, taken in conjunction with the accompanying drawing which represents by way of example some preferred arrangements incorporating the invention.

Figure 1:
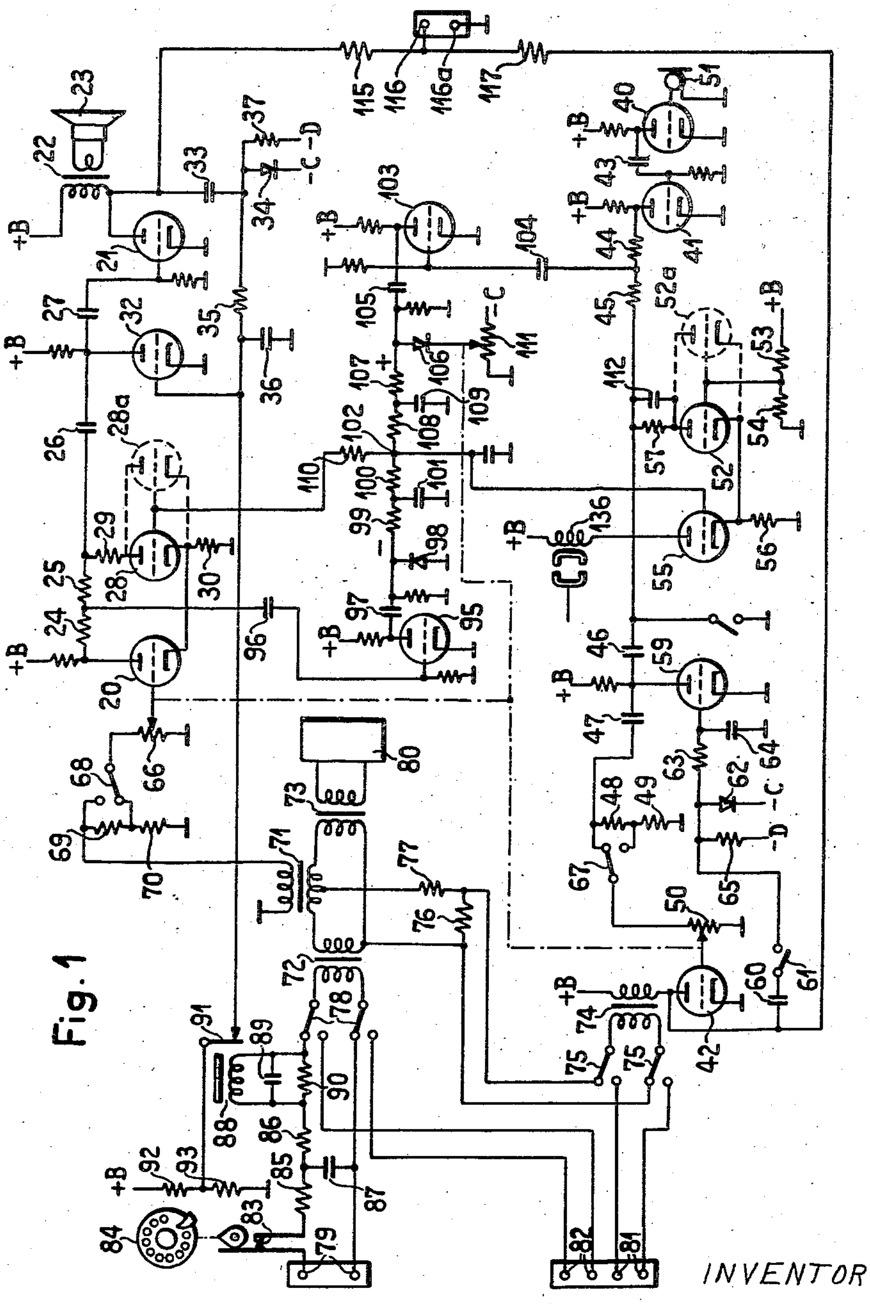
Fig. 1 shows the electric wiring diagram of a part of an arrangement which may be used selectively as loudspeaking telephone or as intercommunication system.
Figures 2, 3, 4, 5:
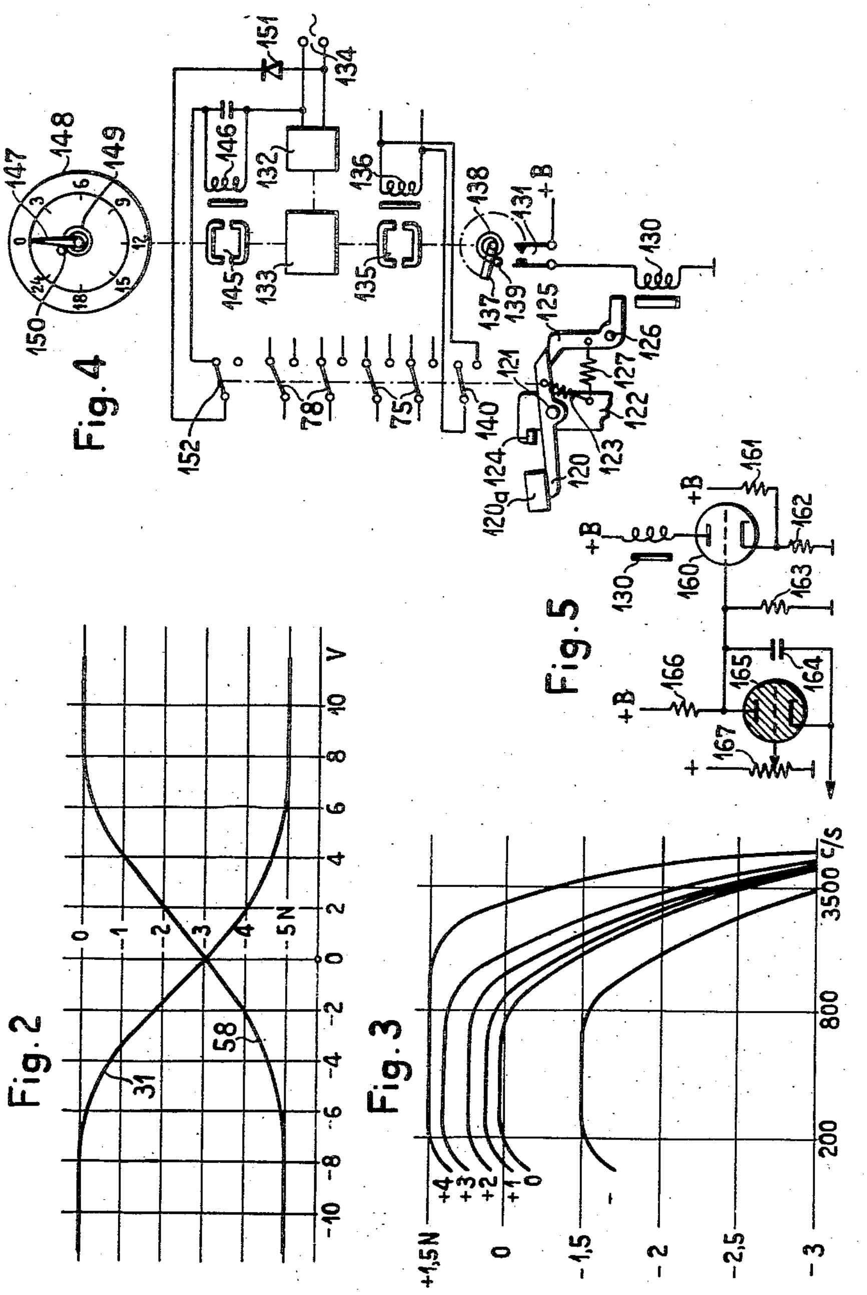
Fig. 2 represents the amplification factor of the receiving and sending amplifiers according to Fig. 1, in function of a common control voltage.
Fig. 3 represents several amplitude-frequency-curves of the sending amplifier at different control conditions.
Fig. 4 shows half-diagrammatically another part of the same arrangement.
Fig. 5 is the electric diagram of an arrangement as modified with respect to Fig. 4.

Referring more particularly to Fig. 1, the invention is illustrated as comprising an apparatus having a receiving amplifier with a input amplifier valve 20, an output amplifier valve 21 and an output transformer 22 to which is connected a loudspeaker 23 for reproducing an incoming call. The amplifier valves 20 and 21 are coupled together via two fixed resistors 24, 25 and condensers 26, 27. Together with the internal resistance of an electron valve 28 and a further resistance 29, the resistors 24, 25 constitute a potential divider for the signal to be amplified. In said potential divider the internal resistance of the valve 28 forms an adjustable resistance to alter the amplification factor of the receiving amplifier. The internal resistance of the valve 28 can be steadily changed through a control potential on the grid of said valve. Through a resistance 30 in the cathode of tube 28 its grid-cathode circuit will be biased to such an extent that with a control potential of zero volt with respect to earth (chassis), the internal resistance of the valve 28 will assume a value between its minimum and its maximum. The earth (chassis) of the apparatus is in Fig. 1 each time represented by a short horizontal dash. To obtain a sufficiently small resistance, if required, a second valve 28*a* may be placed in parallel with the valve 28. The resistance 29 is put in series to the anode circuit of valve 28 and serves for fixing the minimal valve of the internal resistance or of the maximum damping of the potential divider. If the control potential at the grid of valve 28 becomes negative, the amplification factor of the receiving amplifier will then steadily increase to a maximum valve; but if this control potential becomes positive, the amplification factor will steadily decrease down to a minimum value, as shown in Fig. 2 by the curve 31 representing the amplification factor in nepers in function of the control potential.

Together with the internal resistance of a further electron valve 32, the resistors 24, 25 also constitute a potential divider, in which the internal resistance of the valve 32 represents an adjustable resistance to alter the amplification factor in the receiving amplifier. From the output of valve 21 a signal potential is taken and supplied to a rectifier 34 which, with respect to the earth, is biased through a negative potential —C. The arising direct voltage is via smoothing means 35, 36 supplied as control potential to the control grid of valve 32, which moreover lies at a negative grid biasing potential —D via separating resistance 37. The second-named potential divider 24, 25, 26 serves for altering the amplification factor of the receiving amplifier in dependency on the level of the output signal. If said level is in excess of a definite value fixed through the biasing potential —C of the rectifier 34, a positive potential will set up at the rectifier, which reduces the negative potential at the grid of valve 32, thus lessening the internal resistance of said valve, whereby the amplification factor decreases. Consequently the further rise of the output level will be counteracted, in other terms the output level of the receiving amplifier is limited.

Fig. 1 shows moreover a sending amplifier including two input amplifier valves 40 and 41 together with an output amplifier valve 42. The coupling between the two input amplifier valves 40 and 41 takes place via a condenser 43, while the second input amplifier valve 41 is coupled to the output amplifier valve 42 via two fixed resistors 44, 45, two condensers 46, 47, a potential divider with the resistors 48, 49 and a potentiometer 50. Joined to said sending amplifier is a microphone 51 for an outgoing speech.

Together with the internal resistance of an electron tube 52 and a further fixed resistance 57, the fixed resistors constitute a potential divider for the signal to be amplified. Therein the internal resistance of the tube 52 is an adjustable resistance capable of being controlled by altering the grid-cathode-potential of said tube. The grid of tube 52 is by means of a potential divider 53, 54 connected to a positive potential +B, while the cathode of the same tube is connected to the cathode of a phase inverter tube 55, the working resistance 56 of which lies in the cathode circuit. Both tubes 52 and 55 are interconnected by direct current coupling. A control potential for altering the amplification factor of the sending amplifier is fed to the grid of the phase-inverter tube 55. The working points of the tubes 52 and 55 are chosen that, with a control potential of zero volts with respect to the earth, the internal resistance of the tube 52 will assume a value between its maximum and its minimum. To attain a sufficiently small internal resistance, if required, a second tube **52*a* may be placed in parallel with tube 52. The fixed resistance 57 lies in the anode circuit of tube 52 and serves for fixing the minimum value of the internal resistance or the maximum damping of the potential divider. If the control potential at the grid of the phase inverter tube 55 is negative, the amplification factor of the sending amplifier will steadily decrease down to a minimum value; but if said control potential is positive, the amplification factor steadily rises to a maximum value, as illustrated in Fig. 2 by the curve 58** which shows the amplification factor in function of the control potential.

Together with the internal resistance of a further electron valve 59, the resistors 44, 45 constitute an additional potential divider, wherein the internal resistance of the valve 59 represents an adjustable resistance to alter the amplification factor of the sending amplifier. From the output of valve 42 a signal potential is taken via condenser 60 and supplied through a switch 61 to a rectifier 62 which, with respect to the earth, is biased through a negative potential —C. The arising positive direct potential is—via smoothing means 63, 64—supplied as automatic volume control potential to the control grid of valve 59. Said grid is moreover connected via separating resistance 65 to a negative grid biasing potential —D. The second-named potential divider 44, 45, 59 serves for altering the amplification factor of the sending amplifier in dependency on the level of the output signal of said amplifier, i. e. in such a way, that the output level will be defined at a maximum value fixed through the biasing potential —C of the rectifier 62, similarly as in the receiving amplifier. By opening the switch 61 said defining action may be nullified for a purpose which will be explained as description proceeds.

The potentiometer 50 in the sending amplifier is mechanically positively coupled with a similar potentiometer 66 preceding the input amplifier tube 20 of the receiving amplifier. Both potentiometers may from outside be adjusted by hand so that upon decrease of the amplification factor in the sending amplifier, automatically a somewhat equivalent increase of the amplification factor will take place in the input amplifier and vice-versa. The purpose of said potentiometers 50 and 66 will be explained later on.

The potential divider 48, 49 may be adjusted with the aid of a switch 67 which is mechanically coupled with a further switch 68 serving to change-over a similar potential divider 69, 70 at the input of the receiving amplifier. The two switches 67 and 68 operate positively in opposition to each other so that upon actuation of them the amplification factor of the input amplifier will be reduced by a certain amount and at the same time the amplification factor of the sending amplifier will be increased by an equal amount or vice-versa.

The input of the receiving amplifier is joined to a bridge with three transformers 71, 72, 73. The output of the sending amplifier is also connected to said bridge via an output transformer 74, a bipolar commutator switch 75 and a damping member 76, 77. The transformer 72 is connected via a bipolar commutator switch 78 with junction contacts 79 adapted, say, for connection to a two-wire telephone line. The transformer 73 is connected with a network 80 of said telephone line. Said bridge is in known manner so provided that an incoming signal over the contacts 79 is as completely as possible applied to the input of the receiving amplifier, and that an outgoing signal from the output of the sending amplifier reaches the contacts 79 as completely as possible, and the input of the receiving amplifier as little as possible. With the help of the commutator switch 75, however, the output of the sending amplifier may also be led to two further junction contacts 81, and by means of the commutator 78 the transformer 72 may be connected with two additional junction contacts 82. The switches 75 and 78 are mechanically positively coupled with each other so that the input of the receiving amplifier and the output of the sending amplifier will be either simultaneously wired to the contacts 79 or then to the contacts 82 and 81 respectively.

In one junction wire between transformer 72 and contacts 79 there is a contact 83 closed in position of rest and operatively connected with a finger plate 84 for dialling-in so that upon operating the dial 84 the contact 83 each time opens according to the dialled number to produce selector impulses. Moreover, between said contact 83 and switch 78 there is an artificial line 85, 86, 87 and the coil of a relay 88 which are all wired in series. The inductivity of the coil of relay 88, together with a condenser 89, is tuned to a frequency outside the range of speech frequency to be transmitted, and damped by a resistance 90. The relay 88 has a rest contact 91 which on the one hand is connected with the control grid of tube 32 of the receiving amplifier, and on the other hand with a potential divider 92, 93 having a positive potential +B applied thereto.

Should the contacts 79 be connected to a telephone line for automatic service and if the switch 78 takes the position shown in Fig. 1, the relay will be energized by a current supplied from the telephone exchange. Contact 91 is then open. On dialling (with disk 84) the current circuit is each time broken according to the impulses, the relay being each time de-energized and the contact 91 momentarily closed. Now the grid of tube 32 will be reached by an additional positive potential which makes the internal resistance of said tube to become small so as to cause the amplification factor of the receiving amplifier to decrease accordingly. In this way, the noise caused by clicks when dialling will be largely removed from loudspeaker 23, and detuning of the bridge each time caused by interruption of the line will not lead to whistling.

Further, the apparatus as shown in Fig. 1 includes an automatic control device adapted to generate the control potential for the control grids of the valves 28 and 55. Said control device comprises a first control potential amplifier with a valve 95, the control grid of which being coupled via a condenser 96 with the output of the input amplifier tube 20 of the receiving amplifier, the junction taking place between the two fixed resistors 24 and 25. From the output of the amplifier tube 95 the amplified control potential is applied via condenser 97 to a rectifier 98 which, with respect to earth, generates a direct voltage in dependency on the intensity of the incoming signal to be amplified in the receiving amplifier. This direct voltage is led to a point 102 via a smoothing filter 99, 100, 101. The control device further includes a second control potential amplifier with an electron valve 103, the control grid of which is joined via condenser 104 to the output of the input amplifier tube 41 of the sending amplifier, i. e. between the fixed resistors 44 and 45. Connected to the output of said control potential amplifier tube 103 via a condenser is a second rectifier 106, which, with respect to the earth, generates a positive direct potential, also led to the point 102 via smoothing filter 107, 108, 109. Consequently, between said point 102 and the earth a potential will be set up which is equal to the difference of the two generated and aforementioned direct potentials. Said differential potential is applied as control potential to the grid of tube 55 direct, and to the grid of tube 28 via separating resistance 110 to automatically alter the amplification factors in the receiving and sending amplifiers.

The second rectifier 106 is biased through a negative potential tapped on potentiometer 111 placed between earth and a potential —C. Through said biasing potential it will be achieved that at point 102 a positive control potential will set up only if the microphone level is in excess of a definite threshold value. The potentiometer 111 is mechanically coupled with the two potentiometers 50 and 66 in such a way that upon lowering the sending amplification and upon increasing the receiving amplification said threshold value will simultaneously be increased and vice-versa.

The action of the arrangement described so far is as follows: Suppose, the contacts 79 be connected with a telephone line and the switches 75 and 78 be in the position as in Fig. 1. If neither the microphone 51 is voice-operated nor is a speech directed through said telephone line to the receiving amplifier, the control potential set up at point 102 will be equal to zero. Then, according to Fig. 2, the receiving and sending amplifiers will have a mean amplification factor so small that acoustic reaction from the loudspeaker 23 to the microphone 51 is excluded, even with no ideal bridge 71, 72, 73.

Incidental to an incoming call in the receiving amplifier, a signal is led via tubes 20 and 95 to the rectifier 98 and at point 102 a negative control potential will set up, which is the higher the more intense the incoming signal will be. Thus, according to Fig. 2, the amplification factor in the receiving amplifier will steadily increase and simultaneously that in the sending amplifier will steadily decrease. In the loudspeaker 23 this incoming speech is audible very distinctly. Yet an acoustic reaction via microphone 51 is avoided because, simultaneously, the amplification factor of the sending amplifier has been reduced to the required extent. Upon termination of the incoming call the original condition will automatically be restored, as the control potential at point 102 again takes the value of zero. If then the microphone 51 is voice-operated, an amplified signal will reach via tubes 40, 41 and 103 to the rectifier 106 which at point 102 now causes a positive potential. Thus, according to Fig. 2, the amplification factor of the sending amplifier will steadily increase and that of the receiving amplifier steadily decrease. The outgoing speech will therefore be emitted with sufficiently strong level onto the telephone line. Acoustic reaction which due to deficient balance of the bridge 71, 72, 73 could take place via loudspeaker 23 will be efficiently avoided by the fact that at the same time the amplification factor of the receiving amplifier has been reduced.

If, incidental to carrying on a long-distance speech with high damping, the intelligibility should not suffice, the switches 67 and 68 may be changed over, whereupon a higher input signal will be led to the first amplifier stage of the receiving amplifier so that in the loudspeaker 23 the incoming call will be better understood. To avoid acoustic reaction it is, however, necessary at the same time to reduce the amplification factor in the sending amplifier by means of switch 67. Nevertheless, in order to give the outgoing speech with sufficiently high level onto the telephone line, the switch 61—mechanically coupled with the switches 67 and 68—will be opened, so that the limiting action in the sending amplifier is removed. By operating the microphone 51 at a more loud voice, the output level of the sending amplifier may, if necessary, be increased to its maximum value.

Should the surroundings of the microphone 51 be comparatively noisy in the room, the biasing potential at the rectifier 106 may be increased by means of the potentiometer 111 in order that the threshold value of the microphone level, at which a positive control potential is set up at point 102, rises accordingly. Otherwise, with much general noise at the microphone 51, the speech of the intercommunicating person may under circumstance never go through to the loudspeaker 23 because, through the noise, a positive control potential would be caused to set up at point 102. At the same time the amplification factor of the receiving amplifier will be increased by means of the potentiometer 66 so as to favour the setting up of a negative control potential at point 102. In order that no risk of feedback takes place, at the same time the amplification factor of the sending amplifier will be reduced through the potentiometer 50.

To eliminate the disturbing effect of general room noises at the microphone 51, provision is made for a frequency-dependent member in the potential divider 44, 45, 57, 52, by placing a condenser 112 in parallel with the resistor 57. If the amplification factor of the sending amplifier is low, the high speech frequencies and noise frequencies will thus be subject to a damping which is a multiple of that of the mean and low frequencies. With increasing amplification factor, however, the additional damping of the high frequencies becomes zero. The corresponding amplitude-frequency-characteristics are shown in Fig. 3 by way of example.

The output of the receiving amplifier is carried via separating resistance 115 to a junction contact 116, whereas the output of the sending amplifier is connected via another separating resistance 117 with the same contact 116. The two resistors 115 and 117 are so chosen that at contact 116, both with an incoming speech as well as with an outgoing speech, substantially equal signal intensities will arise. Between contact 116 and a contact 116*a* connected to the earth, a magnetic sound recorder may, for instance, be joined, which then would record the outgoing and the incoming speeches at approximately the same volume.

Joined to the contacts 81 and 82 may be a four-wire line to one or several satellite stations. Via a pair of wires of said line a distant microphone will be connected to the contacts 82, and via another pair of wires a distant loudspeaker will be joined to the contacts 81. If then the switches 75 and 78 are changed over from the position as in Fig. 1, the arrangement may be used as intercommunication system, in which no change-over to "speaking" and "listening" is necessary. Changing-over occurs automatically in the aforedescribed way by the incoming and outgoing speeches themselves.

According to Fig. 4, the switches 75 and 78 may be connected to a key lever 120 rockably mounted on an axle 121 supported in a frame 122 of the apparatus. A draw-spring 123 at one end engages the frame and at the other end the key lever 120 to restore this each time upon depression into the starting position in which it abuts on a stop 124 formed on the frame 122. Associated with the key lever 120 is a pawl pivotally arranged about an axle 126 supported in the frame or chassis. Said pawl 125 stands under the influence of a draw-spring 127 engaging the chassis 122 and the pawl and tending to keep said pawl in engagement with the key lever 120. By depressing the key 120*a* of lever 120 the pawl 125 will be thrust back by a bevelled face on lever 120 to fall in afterwards under the free extremity of lever 120 due to the action of spring 127. Thus the key lever 120 will be locked in its depressed condition. The switches 75 and 78 coupled with the lever 120 then occupy the position indicated in Fig. 1, i. e. the receiving amplifier and the sending amplifier will be connected via bridge 71, 72, 73 with the two-wire telephone line. Said pawl 125 further constitutes the armature of an electro-magnet which at one end is connected to earth and at the other end to a source of current (potential) +B.

Fig. 4 diagrammatically shows a synchronous motor 132 for driving a clockwork 133. The motor 132 is fitted with terminals 134 for connection to an alternating current system. By means of a coupling 135 engageable by an electro-magnet 136 the clockwork 133 is joined to a wiper 137 adapted to close the contact 131. The wiper 137 is under the action of a resetting spring 138 which tends to keep the wiper abutting on a stop 139. The electro-magnet 136 is inserted in the anodic circuit of the phase inverter tube 55 of Fig. 1 and is indicated therein. Coupled with the key lever 120 is a further switch 140 bridging the coil of the electro-magnet 136 when the key 120*a* is not depressed.

The clockwork 133 may further be coupled with a pointer 147 via a second coupling 145 engageable through an electro-magnet 146. Said pointer 147 rotates over a dial 148 with minute divisions and is under the influence of a resetting spring 149 which tends to restore it to zero position, in which it will abut on a stop 150. The electro-magnet 146 is joined to the contacts 134 via a rectifier 151 and a switch 152. The latter is also coupled with the key lever 120 and will be closed only upon depression of the key 120*a*.

The action of the parts of the arrangement as described with reference to Fig. 4 is as follows: When key 120*a* is not depressed, the sending and receiving amplifiers are connected to the contacts 81 and 82 respectively via switches 75 and 78. The arrangement may then be employed in the indicated manner as intercommunication system. Should it, however, be desired to use the arrangement as loudspeaking telephone, the key 120*a* should be depressed. The switch 78 will then serve as the otherwise customary cradle contact of ordinary telephone apparatus. The magnet 146 will be energized by means of switch 152 and thus the pointer 147 becomes coupled with the clockwork 133 to indicate the duration of speech. An incoming call will cause at point 102 and grid of the phase inverter tube a negative control potential with respect to earth, whereby the anodic current of said tube 55 becomes so small that the magnet 136 is de-energized and the coupling 135 consequently released. At termination of an incoming speech, however, the control potential at the grid of tube 55 is equal to zero or positive, providing the microphone 51 is voice-operated, whereby the anodic current in tube 55 rises, the magnet 136 gets energized and the coupling 135 engaged. The wiper 137 then starts to turn slowly. But a few minutes will pass until it moves into the range of contact 131 so that mutual speeches over the loudspeaking telephone are rendered possible without any difficulty as described hereinbefore. Each time incidental to an incoming speech the grid of tube 55 becomes again negative and the magnet 136 de-energized, whereby the spring 138 restores the wiper 137 to normal. If the incoming speech is completed and if no more incoming speeches are received for a few minutes, the wiper moves into the range of contact 131 which will be closed. The magnet 130 will thus be energized, whereby the pawl 125 releases the key lever 120. The latter is restored to normal by the action of spring 123, whereby the switches coupled therewith will be changed-over. The switch 140 thereby bridges the magnet 136 so that this becomes de-energized and the coupling 135 released. The arrangement may then again be used as intercommunication system. The switch 152 disconnects the circuit of magnet 146, whereby the coupling 145 is released and the pointer 147 springs back to its starting position.

It may be added that the output power of the sending amplifier is sufficiently large in order to drive at least one remote loudspeaker in the intercommunication service. If operated as loudspeaking telephone, said power is not to be put onto the telephone line, for which reason provision is made for damping members 76, 77 in the connection between the output of the sending amplifier and the bridge 71, 72, 73.

The automatic, lagged release of the key 120*a* disclosed with refrence to Fig. 4, may also be accomplished by means other than by a clockwork. According to Fig. 5, for instance, the coil of the electro-magnet 130 is placed in the anodic circuit of an electron tube 160, the cathode of which being positively biased say to 100 volts through a potential divider 161, 162, with respect to earth. The control grid of said tube 160 is connected to the junction point of two resistors 163 and 166 which together constitute a potential divider which on the one hand lies on earth and on the other hand on a positive potential +B. Through said potential divider the potential at the grid will be kept as high as the potential at the cathode. Connected with the control grid of tube 160 is moreover the anode of an electric gas discharge tube 165, the cathode of which being joined to the cathode of the phase inverter tube 55 in Fig. 1. Said discharge tube possesses a control grid which, by means of an adjustable potentiometer 167 is at a comparatively small positive potential with respect to the earth. Placed in parallel with the discharge tube 165 is a condenser 164. The combination formed of said condenser and resistor 166 has a long time constant of, say, several minutes, according to the desired lag, with which the key 120*a* on completion of an incoming speech should be automatically released.

The action of the last described arrangement is as follows: During the continuity of an incoming speech a negative control potential prevails at the control grid of the phase inverter tube 55, thus rendering the cathode of said tube more negative with respect to the position of rest. The cathode of the discharge tube 165 becomes thereby also more negative, whereas the control grid of said tube remains at unchanged potential. The discharge tube thereby comes to ignition, whereby the potential at the grid of tube 160 drops to, say, 80 volts and becomes strongly negative with respect to its cathode so that no anodic current will flow. The magnet 130 is then not energized. On completion of an incoming speech, however, the potential rises at the cathode of the phase inverter tube 55 and discharge tube 165. The latter becomes non-conductive, whereupon the condenser 164 will be slowly loaded via resistor 166. When the incoming speech is continued, the discharge tube again ignites, whereby the condenser 164 suddenly unloads. If, however, the incoming speech should fail to occur for a rather long time, the condenser 164 will be entirely loaded, whereupon the anodic current of tube 160 grows sufficiently to energize the magnet 130. The pawl 125 in Fig. 4 will thus be moved from its locking position, whereby the key-lever 120 assumes its position of rest and changes over the switches 75 and 78.

Besides a device of the type described for automatically releasing the key 120*a* on completion of a speech, the apparatus is preferably provided with an additional releasing key allowing the pawl 125 to be actuated by hand. Because in the case of the loudspeaking telephone replacing the receiver onto the cradle is dispensed with, as there is no receiver at all, the function of the otherwise usual fork contact should be brought about in another way, i. e. by pressing the said releasing key. In the event, however, that one forget to do so, the aforementioned automatic release according to Fig. 4 or Fig. 5 is provided. Obviously still other forms of such automatic release devices will be possible.

Figure 6:
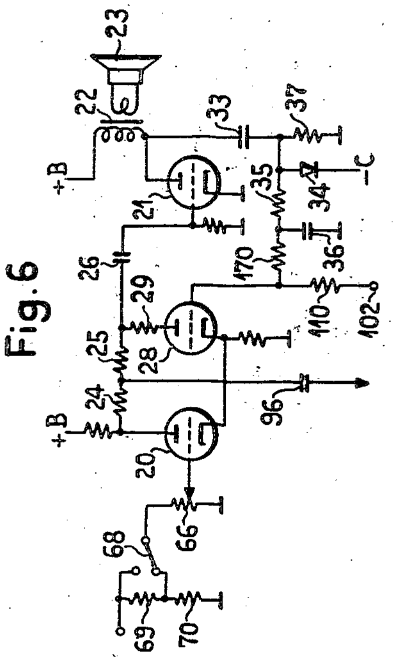
Fig. 6 represents the electric diagram of a modified embodiment of the receiving amplifier of the arrangement.

Fig. 6 represents a modified form of the receiving amplifier, whereby the elements corresponding to Fig. 1 are given identical reference numerals. The difference lies in a more simple design of the means for limiting the output level. The tube 32 of Fig. 1 is omitted; instead of the controlling direct potential smoothed through the means 35, 36 is directly applied via a separating resistor to the control tube 28 to which is supplied, via the special separating resistor 110, the control potential also coming from point 102 for altering the amplification factor. Consequently there is a single potential divider 24, 25, 29, 28 present adapted to serve both for altering the amplification factor of the receiving amplifier as well as for defining the output level of said amplifier.

Figure 7:
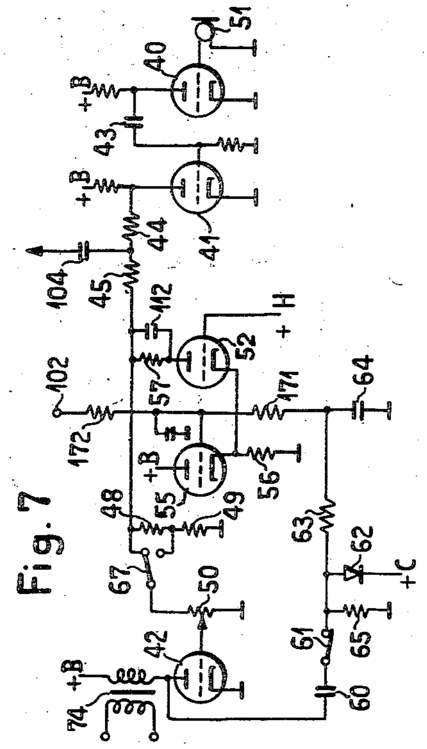
Fig. 7 is the corresponding diagram of a modified embodiment of the sending amplifier.

Fig. 7 shows a similar variation of the sending amplifier. The elements corresponding to Fig. 1 are also in this case identically designated. The difference resides in the fact that in this case the tube 59 of Fig. 1 is dispensed with. The controlling direct potential generated from rectifier 62 and smoothed through the smoothing means 63, 64 is applied via separating resistor 171 to the grid of the phase inverter tube 55 having supplied thereto via a second separating resistor 172 also the control potential coming from point 102. The potential divider 44, 45, 57, 55 serves in this case both for altering the amplification factor of the sending amplifier as well as for limiting the output level of said amplifier.

Figure 8:
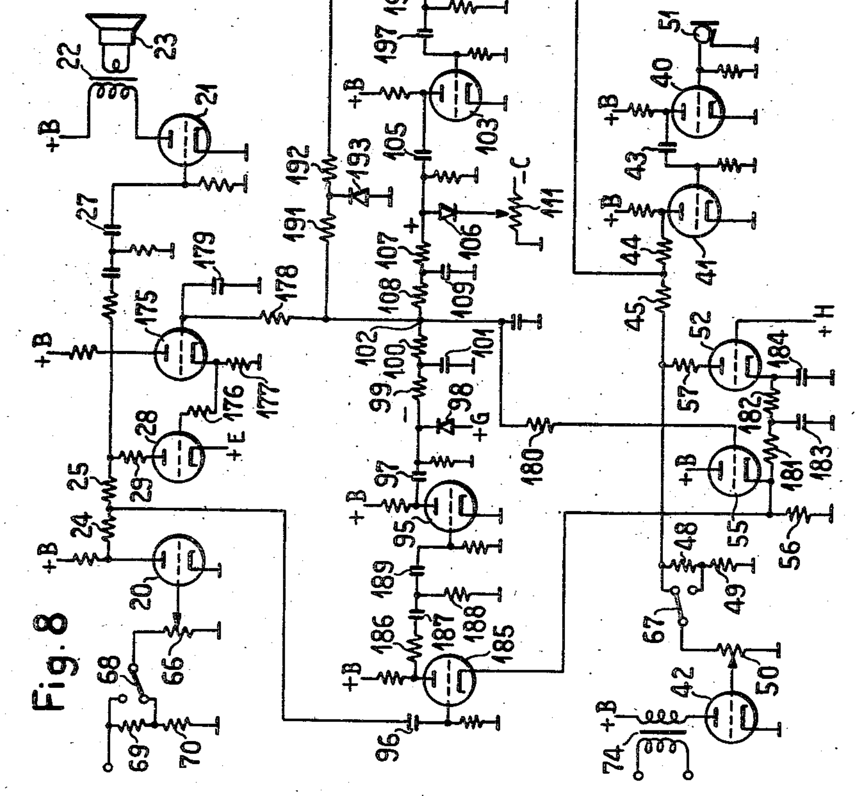
Fig. 8 shows part of the electric wiring of another form of the arrangement.

Fig. 8 shows in contrast to Fig. 1 a somewhat modified wiring. Those elements which correspond to the elements of Fig. 1 are designated with identical reference numerals. The differences reside in the following: Both in the receiving amplifier as well as in the sending amplifier the means for limiting the output level are not shown. In the receiving amplifier the tube 28, whose internal resistance serves as variable resistor of a potential divider 24, 25, 29, 28 for altering the amplification factor, is preceded by a driver tube 175 in direct current coupling. The control grid of tube 28 is joined via resistor 176 to the cathode of the driver tube 175 acting as cathode amplifier with the cathode resistor 177. From point 102 of the automatic control device the control potential is applied via resistor 178 to the grid of the driver tube 175. Said resistor 178 forms together with a condenser 179 a time lagging member.

In the sending amplifier, the grid of the phase inverter tube 55 is connected via resistor 180 to a point 102 of the automatic control device. Inserted between cathode of the phase inverter tube 55 and the cathode of tube 52 the internal resistance of which serving a adjustable resistor in the potential divider 44, 45, 57, 52 for altering the amplification factor, is a time lagging network formed of resistors 181, 182 and condensers 183, 184.

The automatic control device is distinguished from that according to Fig. 1 in that the control potential amplifier tube 95 has in series with it a further input tube 185, the cathode of which is connected with the cathode of the phase inverter tube 55 of the sending amplifier. The coupling together of the tubes 185 and 195 takes place via a noise filter 186, 187, 188, 189 in the form of a high-pass which removes from the rectifier 98 noise signals with comparatively low frequencies. Similarly the tube 103 of the second control potential amplifier has in series with it an input amplifier tube 190, the control grid of which is connected to point 102 in the way of direct current, i. e. under insertion of a separating resistance 191 and a series-resistance 192. Arranged between the junction (point) of said resistors and earth is a shunt rectifier valve 193 so polarized as to define the positive control potential at the grid of tube 190. The coupling between the tubes 190 and 103 takes place via noise filter 194, 195, 196, 197 similarly to that in the other control potential amplifier.

The action of this circuit is as follows: Incidental to an incoming speech in the receiving amplifier, an amplified signal will be supplied via tubes 20, 185 and 95 to the rectifier 98 so that at point 102 a negative grid potential will be set up. This grid potential is applied via resistors 191, 192 to the grid of tube 190 in the second control potential amplifier. The cathode in said tube 190 is through a positive potential +F biased in such a way that already at a control potential of, say, −2 volts the working point of tube 190 will be driven into the cut-off region. Thus the second control potential amplifier with the tubes 190 and 103 will be completely blocked, so as to entirely exclude the arising of a positive control potential at point 102. The negative control potential naturally reaches from point 102 also the grid of tube 175 to increase the amplification factor of the receiving amplifier. Because of the member 178, 179, however, said control takes place with a certain time lag so dimensioned that in any case the second control potential amplifier will be blocked previously. In addition the means adapted to alter the amplification factor in the receiving amplifier will only react at higher values of the control potential than the tube 190. For this reason it always ensures first a locking of the second control potential amplifier 190, 103 and only then a noticeable altering of the amplification factor in the receiving amplifier. On the completion of the incoming speech the original control condition will be restored.

If the microphone 51 is voice-operated, an amplified signal will reach via tubes 40, 41, 190, 103 to the rectifier 106 which, at point 102, causes a positive control potential to be set up. This effects an increased current through tube 55 that entails a rise of the potential at the cathode of the tubes 55 and 185. Because of the grid of tube 185 being connected to earth, the working point of said tube is displaced into the cut-off region with the result that the first control potential amplifier with the tubes 185 and 95 will be blocked completely. With a certain time lag caused through the delay network 181, 182, 183, 184 the amplification factor of the sending amplifier will be increased. The means adapted to alter the amplification factor in the sending amplifier will react only at higher values of the control potential, whereas the blocking of the control potential amplifier 185, 95 already sets in at a control potential of about +2 volts. On completion of the microphone speech the original control condition will again be restored.

The merit of the circuit according to Fig. 8 resides primarily in a mutual locking of the control potential amplifier, thus largely ensuring insensitiveness of the control device against reactions from the loudspeaker onto the microphone as well as against bridge detuning. A further merit resides in a still stronger bridging of the whistling danger than is achieved with the circuit according to Fig. 1, as the damping range in the receiving amplifier is extended due to the combination of the tubes 28 and 175.

Figure 9:
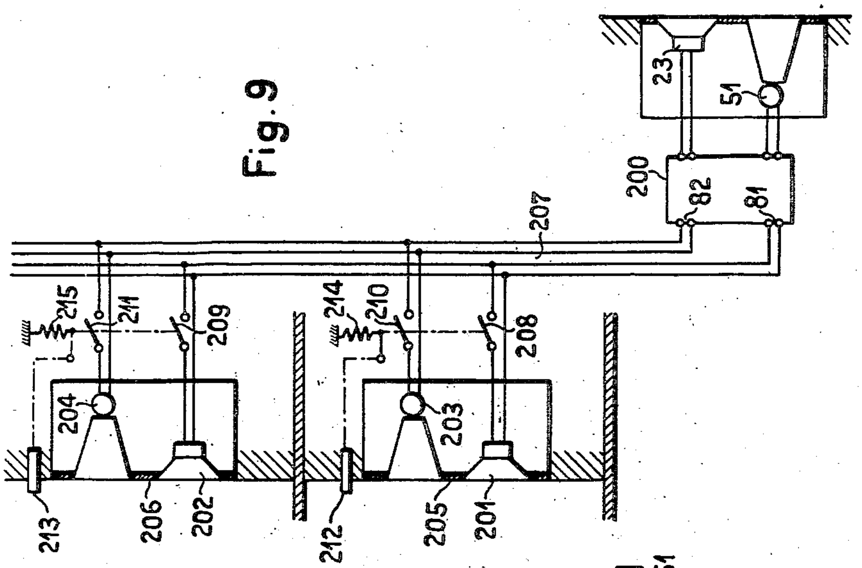
Fig. 9 shows an intercommunication system which may include the connections as in Fig. 1 and 6–8.

In Fig. 9 the numeral 200 denotes an apparatus which may comprise a circuit according to Fig. 1 or Fig. 8. The loadspeaker 23 joined to the receiving amplifier, and the microphone 51 connected with the sending amplifier are marked in Fig. 9 as being outside the apparatus 200. They may for instance be installed at the house door of a big house. In each of the various stories a loudspeaker 201 or 202 and a microphone 203 or 204 may be provided. The pertinent loudspeakers and microphone may be arranged immediately side-by-side, but preferably sunk in tunnel-shaped depressions of a wall 205 or 206. Connected to the contacts 81 of the apparatus 200 is one pair of a four-wire line 207. This pair of wires may be connected through switches 208 or 209 selectively with one of the story loudspeakers 201, 202. Joined to the contacts 82 of apparatus 200 is the other pair of the four-wire line 207. This pair of wires may be connected through switches 210 or 211 selectively with one of the story microphones 203, 204. The switches 208, 210 and 209, 211 respectively are in pairs mechanically coupled with each other, so that each time in a story the loudspeaker and the microphone are connected at the same time. For actuation of the switches provision is made for push-buttons 212 and 213 being under the action of an appropriate resetting spring 214 and 215 respectively. The whole arrangement constitutes an intercommunication system, wherein the main station is formed by apparatus 200, loudspeaker 23 and microphone 51, while the satellite stations are each formed by a loudspeaker 201, 202, a microphone 203, 204 and the associated switches. Switching-on of the system takes place from the satellite stations.

If at the door of said house the bell is actuated on any of the floors, a person on said floor actuates the push-button 212 or 213, whereupon a mutual speech may be carried, without it being necessary each time to change-over to "speaking" and "listening."

Figures 10, 11:
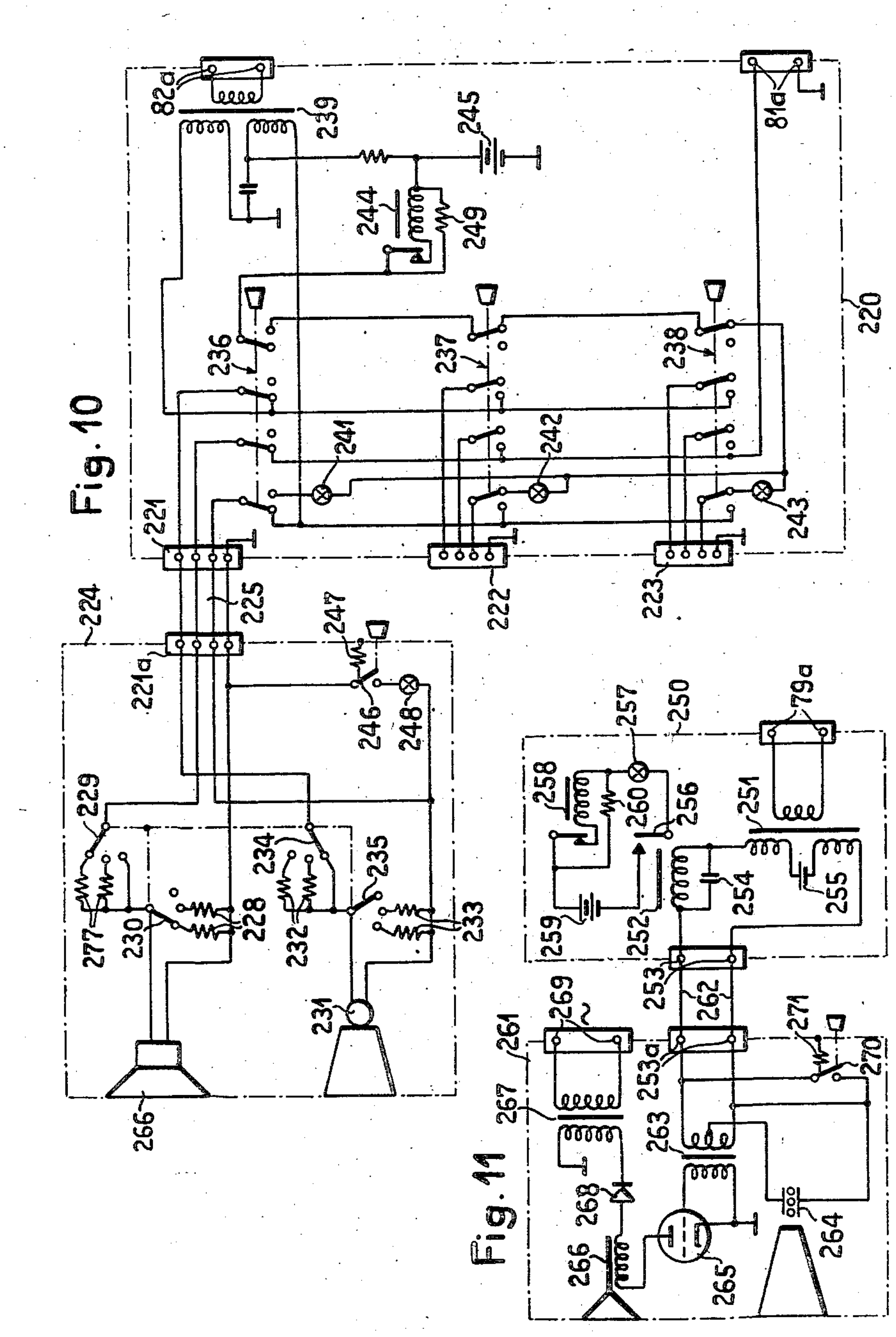
Fig. 10 shows part of another intercommunication system which may be interconnected with the wiring as in Fig. 1 or Fig. 8.
Fig. 11 shows part of another intercommunication system which may be interconnected with the wiring as in Fig. 1.

A similar intercommunication system for switching-on from the main station is partly shown in Fig. 10. Further provided in the main station containing a circuit according to Fig. 1 or Fig. 8 (but not shown in Fig. 10) is an appliance 220 having contacts 81*a* and 82*a* joined to the contacts 81 and 82 respectively according to Fig. 1. Moreover, said appliance is fitted with several four-polar sets of contacts 221, 222, 223 each intended for connection to a satellite station. One of said satellite stations is shown in Fig. 10 and marked with the reference numeral 224. The satellite station 224 has a four-polar set of contacts 221*a* connected via a four-wire line 225 with the set of contacts 221 of the main station. Similar details hold good for the other satellite stations (not shown). Each satellite station includes a loudspeaker 226, in series with the variable damping means 227, 228 which may be adjusted through switches 229 and 230. Each satellite station has moreover a microphone 231 to which variable damping means 232, 233 are put in series. These may be set through switches 234 and 235. Said switches 229, 230, 234 and 235 are all mechanically coupled with each other in such a way that upon reducing the damping in the loudspeaker circuit, at the same time the damping in the microphone circuit will be increased by an equal amount and vice-versa. In the appliance 220 there is further provided for each satellite station a four-polar switch 236, 237 and 238 respectively, operable through a push-button against the action of a resetting spring (not shown). By means of said switch, any of the satellite stations may selectively be joined to the contacts 81*a* and 82*a* in such a way that the loudspeaker 226 will be connected over one pair of wires of line 225 with the contacts 81*a* and thus with the output of the sending amplifier according to Fig. 1 or Fig. 8, while the microphone 231 will be joined over the other pair of wires of line 25 with the contacts 82*a* and thus with the input of the receiving amplifier according to Fig. 1 or Fig. 8. According to Fig. 10 the push-button of switch 236 is actuated. Also provided in the appliance 220 is a transmission-transformer 239 put into the junction between the microphone 231 and the input of the receiving amplifier.

The intercommunication system according to Fig. 10 also includes means permitting one to call from any of the satellite stations the main station. For this purpose, in said appliance 220 provision is made for a signal lamp 241, 242 and 243 respectively for each satellite station, together with a buzzer 244 of the self-interrupter type. To feed said signal transmitter, the appliance 220 comprises a source of direct current 245. In each satellite station there is a switch 246 capable of being closed through a push-button against the action of a resetting spring 247. Said switch 246 lies in series with a signal lamp 248 likewise provided in the respective satellite station. The satellite stations may only call the main station, if none of the switches 236, 237, 238 is operated, i. e. if all satellite stations are disconnected. If then, say, in the satellite station 224, the switch 246 be temporarily closed, the following circuit will result: earth, switch 247, signal lamp 248, signal lamp 241, buzzer 244, source of current 245, earth. Then the signal lamps 241, 248 and the buzzer come into action. In order that upon breaking the buzzer contact, the lamps will glow all the same, the buzzer is bridged by a resistance 249. The lighting up of the signal lamp 241 shows in the main station that the satellite station 224 calls. Upon actuation of switch 236 the desired connection may then be established between the main station and the calling satellite station.

In cases, where between the main station and the satellite station great distances are present which would render too expensive the laying of a four-wire line, the intercommunication system may also be provided for two-wire operation, as illustrated in Fig. 11 by way of example. Also in this case the main station contains a circuit according to Fig. 1 or Fig. 8 with the appropriate loudspeaker 23 and the microphone 51 (not shown in Fig. 11). Further provided in the main station is an appliance 250 fitted with terminals 79*a*. These are connected through two conductors with the contacts 79 in Fig. 1, i. e. they are joined over the bridge 71, 72, 73 both to the input of the receiving amplifier as well as to the output of the sending amplifier in Fig. 1. The means provided in Fig. 1 between the contacts 79 and the transformer 72 may then be omitted. The appliance 250 includes a transmission transformer 251 joined to the contacts 79*a*, which in turn is connected through the coil of a relay 252 with a pair of terminals 253. The coil of relay 252 is shunted by a condenser 254 which tunes it to a resonant frequency lying outside the transmission range of the speech frequencies. The winding of the transformer 251 joined to the terminals 253 consists of two equal halves between which a source of direct current 255 is arranged in series. Said relay 252 possesses a working contact 256 which is series-connected with a signal lamp 257 and a buzzer 258 to a further source of direct current 259. The buzzer 258 is bridged by a resistance 260.

A satellite station 261 has a pair of terminals 253*a* connected via a two-wire line 262 with the terminals 253 of the main station. Moreover provision is made for a bridge-designed transformer 263 being on one hand connected with a carbon-microphone 264 and on the other hand with the grid-cathode-circuit of an amplifier tube 265. Placed in the anodic circuit of said tube 265 is the coil of a magnetic loudspeaker 266. Said tube 265 is fed with direct current by means of a transformer 267 and a rectifier 268, from the alternating current mains to which a pair of terminals 269 is connected.

The satellite station 261 further contains a switch 270 placed in parallel with the terminals 253 and which may be closed through an appropriate push-button and is under the influence of an opening resetting spring 271.

The carbon-microphone receives its feeding current from the source 255 in the main station via the two-wire line 262. On voice-actuating this microphone 264, the signal passes over the line 262, transformer 251 and the bridge 71, 72, 73 according to Fig. 1 to the input of the receiving amplifier. In the loudspeaker 23 the incoming call will be reproduced in the main station. On voice-actuating the microphone 51 in the main station the signal passes from the output of the sending amplifier according to Fig. 1 over the bridge 71, 72, 73, transformer 251, the two-wire line 262 and the bridge-transformer 263 to the amplifier tube 265. In the loudspeaker 266 of the satellite station 261 the speech will be reproduced. The bridge-transformer 263 prevents the loudspeaker 266 from causing acoustic reaction through the microphone 264 that would lead to whistling. In the intercommunication system according to Fig. 11 it is necessary to provide in the satellite station 261 an amplifier 265 to feed the loudspeaker 266, because over the comparatively long two-wire line 262 sufficient power cannot be supplied to feed the loudspeaker 266 directly.

If the switches 75 and 78 of Fig. 1 are changed over and consequently the junction of the satellite station 261 with the receiving station and the sending amplifier according to Fig. 1 interrupted it is possible to call the main station from the satellite station 261 by temporarily closing the switch 270. Thus the relay 252 in the appliance 250 of the main station will be energized so that the buzzer 258 and the signal lamp 257 are put into action by means of the relay contact 256. During the speech said relay 252 is not energized, because the direct current flowing through the microphone 264 is not sufficient therefor.

Figure 13:
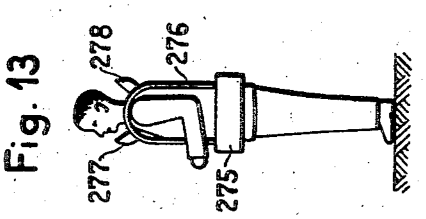
Fig. 13 illustrates a person with a portable two-way radio set which may be part of an arrangement according to the invention.

In an intercommunication system according to Fig. 10 it is possible to substitute a two-way radio connection in place of one or several of the four-wire lines between the main station and one or several of the satellite stations. A satellite station suitable for the purpose is represented in Fig. 13. It comprises a two-way radio set 275 which may be carried by a person by means of a strap hung over the shoulder. Secured on said strap 276 at the height of the shoulder are a microphone 277 and a loudspeaker 278, whose leads may be provided within the strap 276. Said leads could also be used as sending and receiving antennae of the radio set. The microphone 277 is connected with a receiver (not shown) in the main station via a radio transmitter in the set 275, said receiver being joined to the input of the receiving amplifier according to Fig. 1 or 8. The output of the sending amplifier according to Figs. 1 and 8 is connected via a radio transmitter (not shown) with the receiver in the radio set 275, which operates the loudspeaker 278. In this wireless intercommunication system no changing over to "speaking" and "listening" is necessary and yet the occurrence of whistling is prevented in an efficient way.

Figure 12:
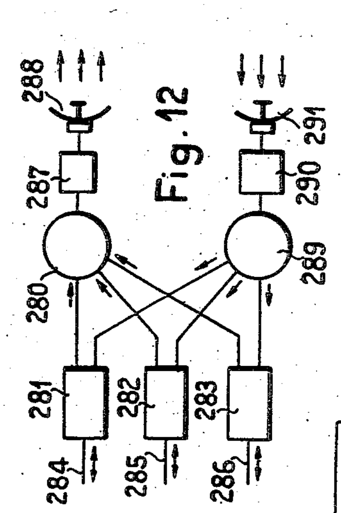
Fig. 12 is a block diagram of a part of a multi-channel transmission arrangement with two radio connections.

Fig. 12 shows part of another arrangement with wireless radio communications. Numerals 281, 282 and 283 designate devices corresponding to the circuit as in Fig. 1. Connected with each of said devices is a two-wire telephone line 284, 285 and 286 respectively, which in Fig. 1 are joined to the contacts 79. The outputs of the receiving amplifiers in the appliances 281, 282, 283 are then, instead of with loudspeakers 23 (Fig. 1) connected with a multi-channel modulator 289. The latter is connected to an antenna 288 via a radio transmitter 287. The inputs of the sending amplifiers in the appliances 281, 282, 283 are then connected with a multi-channel-demodulator 289 instead of with microphones 51 (Fig. 1). Said demodulator is connected to the output of a radio receiver 290 having a receiving antenna 291. At the other end of the wireless transmission path provision is made for a similar arrangement as in Fig. 12. The appliances 281, 282 and 283 efficiently prevent feedback and whistling from originating, even then, when the bridges 71, 72, 73 (Fig. 1) in these appliances are not perfectly balanced. This fact allows connecting telephone lines 284, 285, 286 of varying impedance with the appliances 281, 282, 283 without necessitating a readjustment of the definitely set bridges of said appliances.

What I claim is:

1. In a loud-speaking two-way telephone device, the combination comprising a first transmission path having a receiving amplifier and a loudspeaker for the reproduction of an incoming speech, a second transmission path with a microphone and a sending amplifier for an outgoing speech, a control device attached to both of said transmission paths with control-voltage rectifier networks of reverse polarity directly connected together and fed by the signal in the one or in the other transmission path, which rectifier networks thus supply a sole control voltage between ground and a single point, said control voltage being dependent on the difference between the intensity of the incoming signals in both transmission paths and which can be both positive or negative depending on whether a stronger incoming signal appears in the one or the other transmission path, means in each of said transmission paths to control the amplification rate and actuated by said control voltage, and a phase reversal device in direct current coupling between said point and said control means in one transmission path whereby the amplification rate is automatically increased in that transmission path which receives the stronger incoming signal while in the other transmission path the amplification rate is automatically reduced at least approximately in the same degree.

2. A two-way loud-speaking device as defined in claim 1 wherein the said means to control the amplification rate in both the one and the other transmission path comprise a potentiometer with at least one fixed resistance and one variable resistance, said variable resistance being the internal resistance of at least one electronic tube which is controlled by the said control voltage and includes in the anode circuit a series resistance which prevents the internal resistance of the tube to decrease below a desired value.

3. A two-way loud-speaking device as defined in claim 2 wherein the grid-cathode circuit of said electronic tube serving as potentiometer resistance is biased in either transmission path such that with zero control voltage the internal resistance of said tube shows a value between its minimum and its maximum.

4. Arrangement as claimed in claim 1, characterized in that said amplifiers incorporate each a potential divider commutatable by means of a switch, said switches being positively mechanically coupled with each other so that the amplification factor in the receiving amplifier may be increased or decreased by a certain amount and that said factor in the receiving amplifier is simultaneously decreased or increased by the same amount.

5. Arrangement as set out in claim 1, characterized in that said amplifiers each incorporate a potentiometer manually adjustable to alter the amplification factor, and that these two potentiometers are mechanically coupled with each other so that upon a decrease of said factor of one amplifier that of the other amplifier will be increased and vice-versa, and further characterized by an adjustable direct potential biasing one of said rectifiers, and that for altering the biasing potential at said rectifier provision is made for a regulating member mechanically coupled with said potentiometer in such a way that upon lowering the sending amplification the biasing potential and hence the threshold value of said biased rectifier will simultaneously be increased and vice-versa.

6. Arrangement as set out in claim 1, characterized in that the input of the receiving amplifier and the output of the sending amplifier are connected over a bridge and a set of switches with a two-wire telephone line, that a key for operating the set of switches is provided in lieu of the otherwise customary cradle contact of telephone apparatuses; that the key is under the influence of a first resetting spring and cooperates with a spring-loaded pawl blocking said key in depressed condition against the action of said first resetting spring, further characterized by a first electro-magnet cooperating with said pawl to release the same, as well as by means adapted to automatically energize said electro-magnet each time for a definite duration upon completion of the incoming speech.

7. Arrangement as set out in claim 6, characterized in that the last-mentioned means comprise a clockwork which by means of a coupling engageable through a second electro-magnet can be connected with a movable contact arm which is under influence of a resetting spring which, with released coupling will restore the contact arm to normal, and that the second electro-magnet is electrically connected to means dependent on the said control potential in such a way that on completion of an incoming call the second electro-magnet will be energized and the coupling engaged.

8. Arrangement as set out in claim 1, characterized in that the input of the receiving amplifier is connected with at least one distant microphone over a first pair of lines of a four-wire line, the output of the sending amplifier being connected with at least one distant loudspeaker over a second pair of lines of said four-wire line so that the whole arrangement constitutes an intercommunication system in which during the speech no change-over to "speaking" and "listening" is necessary.

9. Arrangement as set out in claim 1, characterized in that the input of the receiving amplifier and the output of the sending amplifier are connected over a bridge with a two-wire line communicating with at least one distant satellite station having a microphone and a loudspeaker, which both are joined over a second bridge to said two-wire line, the whole being so arranged that a two-wire intercommunication system will result, in which during the speech no change-over to "speaking" and "listening" is necessary.

10. A two-way loud-speaking device as defined in claim 1, wherein said control voltage amplifiers are connected via a control voltage amplifier to the one transmission path and the other transmission path respectively, said control voltage amplifiers including means to control the amplification thereof and which are actuated by the said sole control voltage such that the amplification of that control voltage amplifier which is supplied by the smaller audio signal is automatically reduced, said means controlling the amplification of both of said control voltage amplifiers being sensitive to smaller values of the control voltage than the means which serve to control the amplification of both the transmission paths, whereby the control voltage amplifier which actually receives the smaller incoming signal is blocked before the transmission path fed by the louder incoming signal has reached the maximum amplification.

11. A two-way loud-speaking device as defined in claim 1, wherein said control voltage amplifiers are connected via a control voltage amplifier to the one transmission path and the other transmission path respectively, said control voltage amplifiers including means to control the amplification thereof and which are actuated by the said sole control voltage such that the amplification of that control voltage amplifier which is supplied by the smaller audio signal is automatically reduced, connections between said point at which said sole control voltage is built up, and the means controlling the amplification of both control voltage amplifiers show smaller time constant than time delaying networks which supply the control voltage to the means controlling the amplification in both transmission paths.

References Cited in the file of this patent

UNITED STATES PATENTS

| | | |
|---|---|---|
| 2,208,160 | McCreary | July 16, 1940 |
| 2,282,404 | Herrick | May 12, 1942 |
| 2,545,467 | Jeanlin | Mar. 20, 1951 |
| 2,702,319 | Ryall | Feb. 15, 1955 |
| 2,761,011 | Hardy | Aug. 28, 1956 |

FOREIGN PATENTS

| | | |
|---|---|---|
| 803,389 | France | June 20, 1935 |
| 619,073 | Great Britain | Mar. 3, 1949 |